(12) United States Patent
Soroushian

(10) Patent No.: US 12,028,584 B1
(45) Date of Patent: Jul. 2, 2024

(54) MONITORING ADAPTIVE STREAMING CONTENT WITH SELECTABLE ALERT SENSITIVITY MODES AND PLAYLIST ALERTING FUNCTIONALITY

(71) Applicant: Kourosh Soroushian, San Diego, CA (US)

(72) Inventor: Kourosh Soroushian, San Diego, CA (US)

( * ) Notice: Subject to any disclaimer, the term of this patent is extended or adjusted under 35 U.S.C. 154(b) by 0 days.

(21) Appl. No.: 18/126,386

(22) Filed: Mar. 25, 2023

(51) Int. Cl.
| | |
|---|---|
| *H04N 21/234* | (2011.01) |
| *H04N 21/2343* | (2011.01) |
| *H04N 21/2365* | (2011.01) |
| *H04N 21/2381* | (2011.01) |
| *H04N 21/24* | (2011.01) |
| *H04N 21/41* | (2011.01) |
| *H04N 21/442* | (2011.01) |
| *H04N 21/472* | (2011.01) |
| *H04N 21/488* | (2011.01) |
| *H04N 21/647* | (2011.01) |

(52) U.S. Cl.
CPC ....... *H04N 21/6473* (2013.01); *H04N 21/472* (2013.01)

(58) Field of Classification Search
None
See application file for complete search history.

(56) References Cited

U.S. PATENT DOCUMENTS

| | | | |
|---|---|---|---|
| 2020/0037007 A1* | 1/2020 | Mahvash | H04N 21/44004 |
| 2020/0128255 A1* | 4/2020 | Halepovic | H04N 19/176 |
| 2022/0021929 A1* | 1/2022 | Sen | H04L 65/65 |
| 2022/0417610 A1* | 12/2022 | Chandrashekar | H04N 21/44209 |

\* cited by examiner

*Primary Examiner* — Brian T Pendleton
*Assistant Examiner* — Jean D Saint Cyr

(57) ABSTRACT

A system and method for monitoring adaptive streaming content with selectable alert sensitivity modes and playlist alerting functionality are provided. The method includes downloading manifest files and segments of adaptive streaming content using a computer server. Alerts are generated based on different sensitivity modes for rebuffering events and stream outages. The system provides for stream outage alerting functionality and allows users to choose between the most sensitive mode, normal sensitivity mode, and the least sensitive mode to receive appropriate alerts. The invention is applicable to various adaptive streaming protocols, such as HTTP Live Streaming (HLS), Dynamic Adaptive Streaming over HTTP (DASH), and Common Media Application Format (CMAF).

9 Claims, 5 Drawing Sheets

MONITORING ADAPTIVE STREAMING CONTENT WITH SELECTABLE ALERT SENSITIVITY MODES AND PLAYLIST ALERTING FUNCTIONALITY

FIELD OF THE INVENTION

The present invention relates generally to the field of multimedia content delivery, and more specifically, to a system and method for monitoring adaptive streaming content with selectable alert sensitivity modes and playlist alerting functionality. The invention provides an efficient way to monitor the performance of streaming content delivered using various adaptive streaming protocols, such as HTTP Live Streaming (HLS), Dynamic Adaptive Streaming over HTTP (DASH), and Common Media Application Format (CMAF), by analyzing manifest files and segments to identify rebuffering events, stream outages, and other issues. The invention offers a versatile solution for managing streaming quality, allowing users to select from multiple sensitivity modes for generating alerts, thereby enabling timely and appropriate responses to streaming issues.

LIST OF FIGURES

Figure 1:
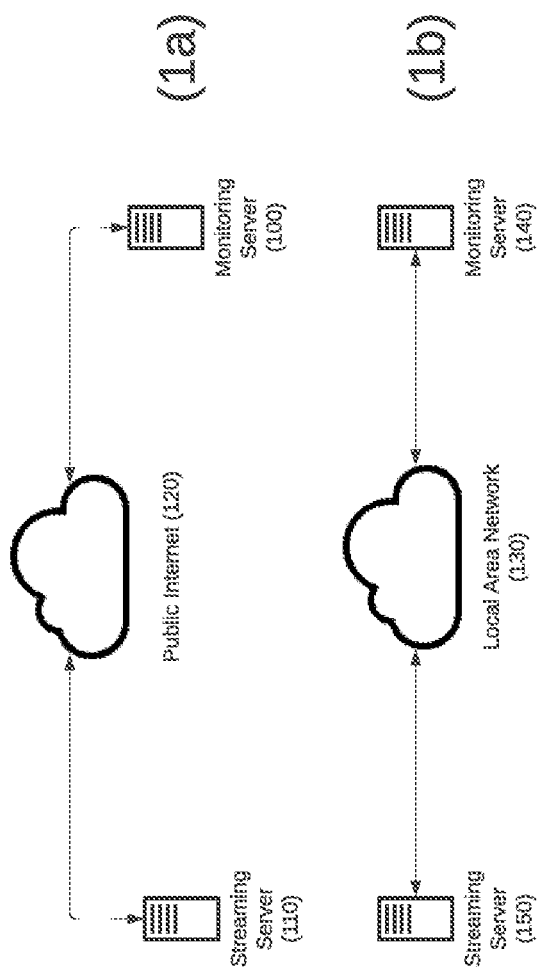

FIG. 1: Overall system architecture for monitoring streams.

Figure 2:
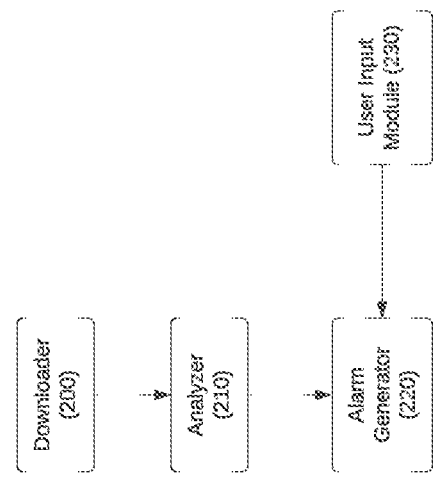

FIG. 2: Software design for downloading and analyzing playlists and segments FIG. 3: Flowchart illustrating the selection process for the three different sensitivity modes: most sensitive mode, normal sensitivity mode, and least sensitive mode.

Figure 4:
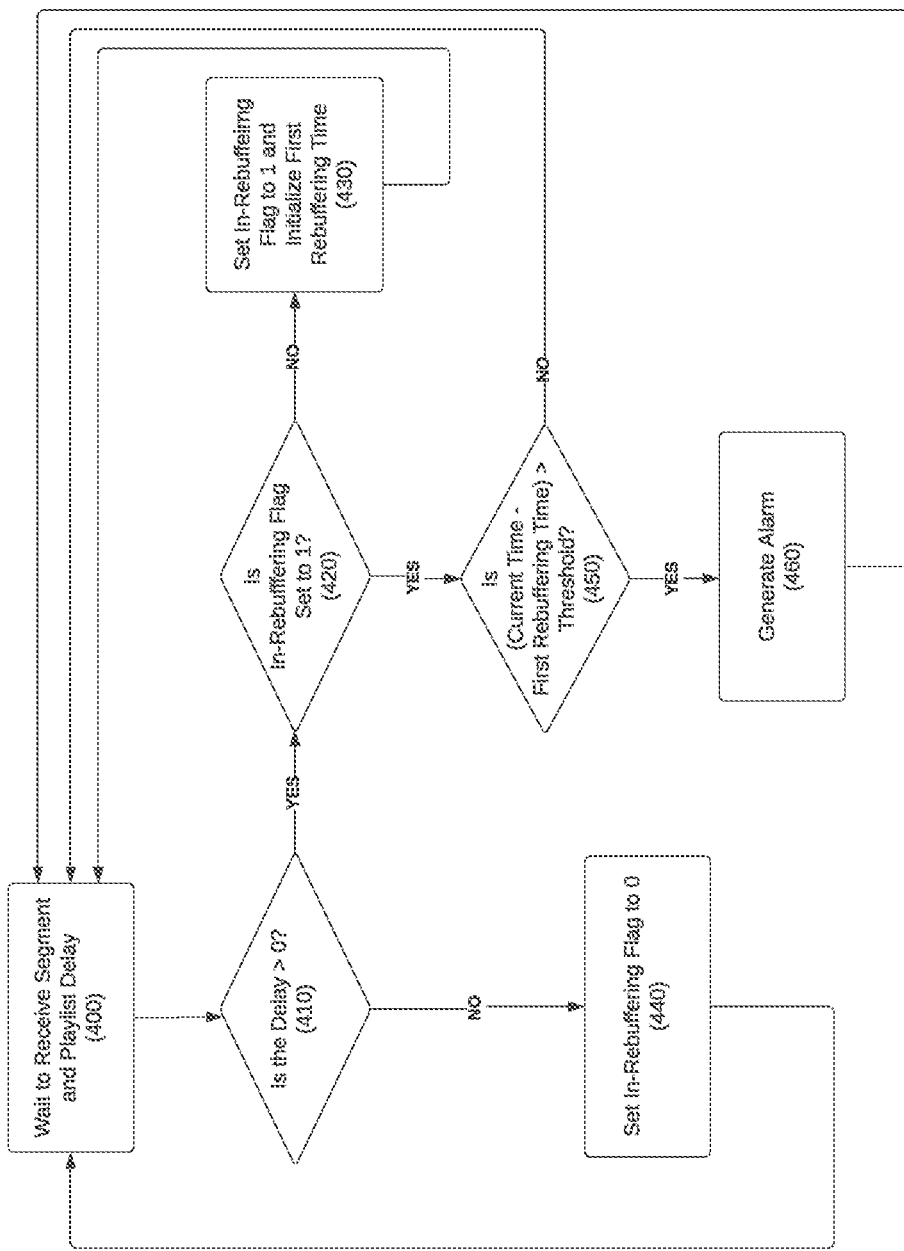

FIG. 4: Flowchart depicting the processing steps and alert generation in the most sensitive mode, focusing on rebuffering duration.

Figure 5:
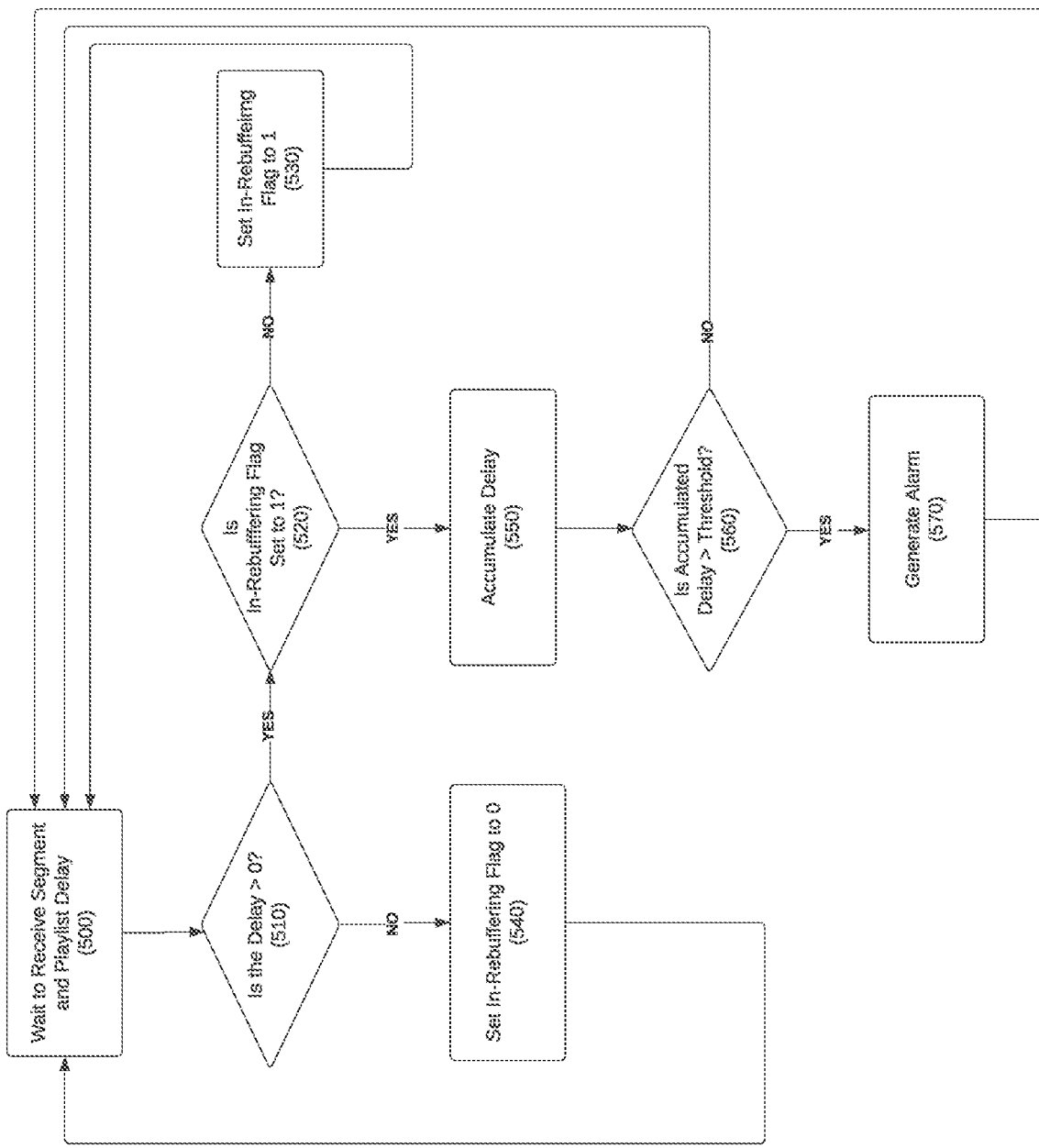

FIG. 5: Flowchart outlining the processing steps and alert generation in the normal sensitivity mode, emphasizing outage accumulations.

Figure 6:
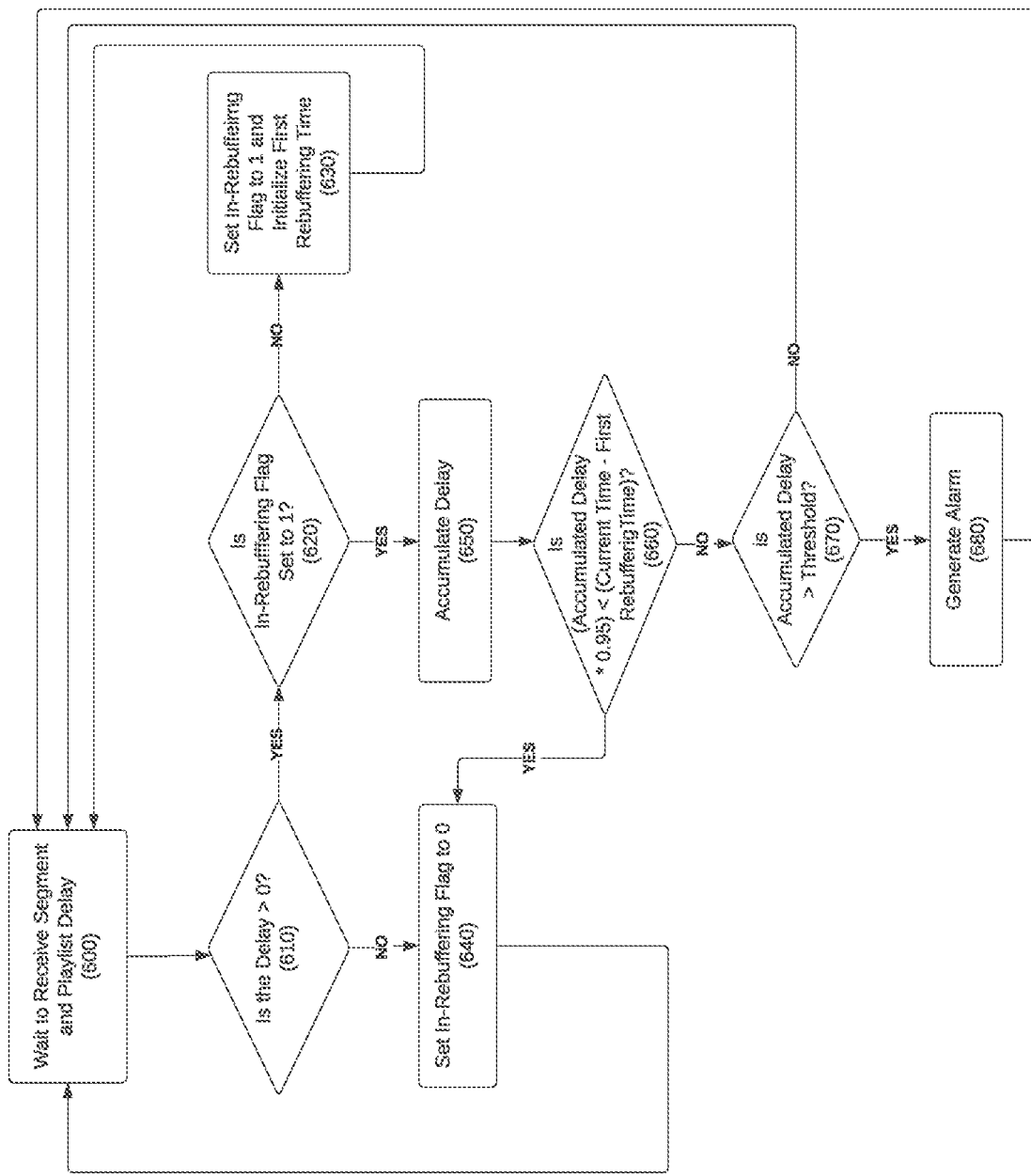

FIG. 6: Flowchart describing the processing steps and alert generation in the least sensitive mode, concentrating on total outages.

SUMMARY

The present invention relates to a method and system for monitoring adaptive streaming content with selectable alert sensitivity modes and playlist alerting functionality. The method and system can be implemented on a cloud server or an on-premises machine. The process involves downloading manifest files containing a list of dynamically updated segments of adaptive streaming content, which is delivered using a generic adaptive streaming protocol such as HTTP Live Streaming (HLS), Dynamic Adaptive Streaming over HTTP (DASH), or Common Media Application Format (CMAF).

The manifest files and segments are analyzed to identify rebuffering events and stream outages. A user can select an alert sensitivity mode from a plurality of sensitivity modes, each having a unique set of criteria for generating alerts. The system generates alerts based on the chosen sensitivity mode and identifies rebuffering events or stream outages and raises alerts for manifest files when a download failure occurs for a specific period of time.

Different sensitivity modes, such as most sensitive, normal sensitive, and least sensitive, have unique criteria for generating alerts, allowing users to specify outage thresholds for each mode. In each sensitivity mode, alerts are generated by measuring a contiguous time duration with specific criteria based on the mode selected.

The system can also detect other types of errors or failures during the streaming process, such as encoding issues, content corruption, or network congestion.

Additionally, the user can specify customizable alert delivery preferences, such as email, SMS, or in-app notifications, allowing them to receive alerts in their preferred format. The method and system are designed to work with various adaptive streaming protocols, including HLS, DASH, and CMAF, by downloading and processing the respective playlists, adaptation sets, and segments or chunks.

DETAILED DESCRIPTION

The following detailed description provides an in-depth understanding of the overall system and method for monitoring adaptive streaming content with selectable alert sensitivity modes and playlist alerting functionality. The system and method are applicable to various adaptive streaming protocols, such as HTTP Live Streaming (HLS), Dynamic Adaptive Streaming over HTTP (DASH), and Common Media Application Format (CMAF).

In some embodiments, the method and system may integrate with content delivery networks (CDNs), media servers, or analytics tools to obtain additional information or to optimize the monitoring process. This integration allows for a more comprehensive analysis of streaming performance and can help identify potential issues that may affect the user experience.

FIG. 1 illustrates an overall system for monitoring adaptive streaming content. In (1*a*), the system consists of a monitoring server (100) which may be hosted in the cloud using a service such as Amazon Web Services (AWS) or Microsoft Azure and communicating with the monitoring server (100) over the internet (120). Similar to the monitoring server (100), the streaming server (110) may be hosted in the cloud using a service such as Amazon Web Services (AWS) or Microsoft Azure. Alternatively, in (1*b*) a monitoring server (140) may be located on a local area network (130) and communicating with the streaming server (150). In either configuration (1*a* or 1*b*), the monitoring server may download manifests and segments from the streaming server on a continuous basis using the available network connection.

FIG. 2 illustrates an overall software designed for monitoring adaptive streaming content, which may be running on the monitoring server (100). The software includes a downloader (200) for obtaining manifest files and segments, which are updated dynamically as new segments become available. The analyzer (210) evaluates the manifest files and segments, monitoring the status of the adaptive streaming content. The alarm generator (220) may accept a signal from the analyzer (210) about the delay in obtaining the manifests and segments. A user input module (230) may be used to specify a chosen sensitivity mode and user-specified parameters.

In some embodiments, the method and system may allow users to specify settings for customizable alert delivery preferences via the user input module (230), such as email, SMS, or in-app notifications. This enables users to receive alerts in their preferred format, ensuring that they are promptly informed about any detected issues with the streaming content. The user input module (230) may be implemented in a variety of ways such as a browser-based interface, a mobile phone application, or an executable program running on the monitoring server.

Figure 3:
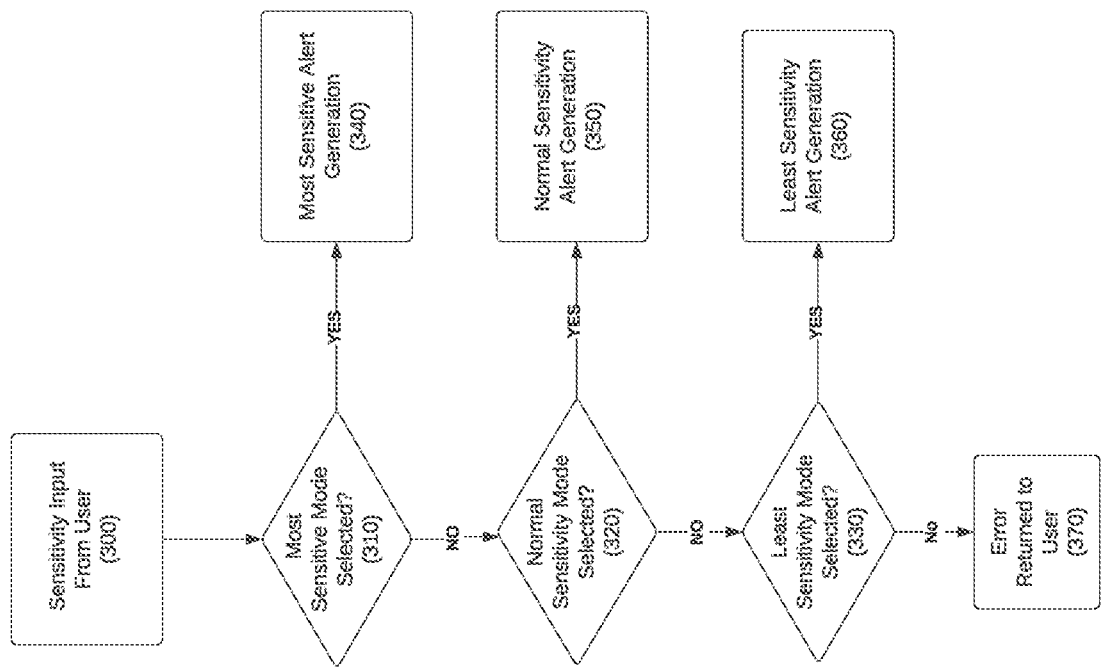

FIG. 3 depicts a flow chart illustrating the selection of the three different sensitivity modes. The user inputs the sensitivity mode (300) from the user input module (230). The user sensitivity input is evaluated and if the most sensitive mode (310) is selected, the most sensitive alert generation (340) is performed. If the most sensitive mode (310) is not selected, the user sensitivity input is evaluated again and if the normal sensitivity mode (320) is selected, the normal sensitivity alert generation (350) is performed. If the normal sensitivity mode (320) is not selected, the user sensitivity input is evaluated again and if the least sensitivity mode (330) is selected, the least sensitivity alert generation (360) is performed. If none of the sensitivity modes are selected, an error is returned to the user (370).

FIG. 4 shows a flow chart for a possible implementation of the process which handles the most sensitive mode (rebuffering duration) that may be part of the alarm generator (220). In this mode, the first stage (400) will wait for the arrival of the delay factor based on the difference between the expected arrival time of playlists or segments and the actual arrival time of playlists or segments. The delay factor is compared with zero (410), and if the delay factor is greater than zero, then the In-Rebuffering binary flag is evaluated (420) to determine whether the process is already in a rebuffering mode or not. If the In-Rebuffering flag is equal to zero, then the In-Rebuffering flag will be set to 1, the First-Rebuffering-Time will be initialized to the current time value (430), and processing returns to the first stage (400). When the In-Rebuffering flag is checked (420) and it is equal to 1, the current time is subtracted from the First-Rebuffering-Time, and if the value is greater than a user-specified threshold (450), then an alarm may be generated (460) after which processing is returned to the first stage (400), and if the value is less than a user-specified threshold (450) then processing returns to the first stage (400). When the delay factor is compared with zero (410), and if the delay factor is less than or equal to zero, the In-Rebuffering flag is set to zero (440) and processing returns to the first stage (400). Overall, this sensitivity mode is suitable for tracking both complete stream outages and intermittent delivery issues.

FIG. 5 shows a flow chart for a possible implementation of the process which handles the normal sensitivity mode (outage accumulation) that may also be part of the alarm generator (220). In this mode, the first stage (500) will wait for the arrival of the delay factor based on the difference between the expected arrival time of playlists or segments and the actual arrival time of playlists or segments. The delay factor is compared with zero (510), and if the delay factor is greater than zero, then the In-Rebuffering binary flag is evaluated (520) to determine whether the process is already in a rebuffering mode or not. If the In-Rebuffering flag is equal to zero, then the In-Rebuffering flag will be set to 1 (530), and processing returns to the first stage (500). When the In-Rebuffering binary flag is checked (520) and it is equal to 1, the delay time from the first stage (500) is accumulated (550). If the total accumulated delay is greater than a user-specified threshold (560), then an alarm may be generated (570) after which processing is returned to the first stage (500), and if the value of the accumulated delay is less than a user-specified threshold (560) then processing returns to the first stage (500). When the delay factor is compared with zero (510), and if the delay factor is less than or equal to zero, the In-Rebuffering flag is set to zero (540) and processing returns to the first stage (500). In this mode, the system monitors the buffering state and triggers an alert when the system is continuously in a rebuffering state, and the sum of outage durations exceeds the user-specified threshold.

FIG. 6 shows a flow chart for a possible implementation of the process which handles the least sensitivity mode (total outage) that may also be part of the alarm generator (220). In this mode, the first stage (600) will wait for the arrival of the delay factor based on the difference between the expected arrival time of playlists or segments and the actual arrival time of playlists or segments. The delay factor is compared with zero (610), and if the delay factor is greater than zero then the In-Rebuffering binary flag is evaluated (620) to determine whether the process is already in a rebuffering mode or not. If the In-Rebuffering flag is equal to zero, then the In-Rebuffering flag will be set to 1 and the occurrence of the First-Rebuffering-Time will be initialized to the current time value (630), and processing returns to the first stage (600). When the In-Rebuffering binary flag is checked (620) and it is equal to 1, the delay time from the first stage (600) is accumulated (650). If the total accumulate delay times a constant factor such as 0.95 is less than the current time minus the first rebuffering time, then this is not considered a total outage and the In-Rebuffering flag is set to zero and processed is returned to the first stage (600); otherwise, if the total accumulated delay is greater than a user-specified threshold (670), then an alarm may be generated (680) after which processing is returned to the first stage (600), and if the value is less than a user-specified threshold (660) then processing returns to the first stage (600). When the delay factor is compared with zero (610), and if the delay factor is less than or equal to zero, the In-Rebuffering flag is set to zero (640) and processing returns to the first stage (600). This mode may be suitable for tracking total outages of a streaming server.

The detailed description of the figures, along with the individual components, provides a comprehensive understanding of the invention. The monitoring system, with its selectable alert sensitivity modes and playlist alerting functionality, enables content providers and streaming services to effectively monitor and manage the performance of adaptive streaming content, ensuring a high-quality streaming experience for end users.

In addition to the figures and components described above, the monitoring system also incorporates various features that ensure seamless and efficient monitoring of adaptive streaming content.

In addition, the analyzer may also be configured to detect other types of errors or failures during the streaming process, such as encoding issues, content corruption, or network congestion. This enables a more comprehensive monitoring of the streaming content and ensures that potential issues are identified and addressed as early as possible.

The analyzer (210) continuously assesses the status of the adaptive streaming content and generates alerts according to the chosen sensitivity mode. By monitoring the status of manifest files and segments, the analyzer provides valuable insights into the streaming performance, enabling users to take appropriate corrective measures when necessary.

Furthermore, the system can be customized to suit the specific needs of individual users by allowing them to select their preferred sensitivity mode and specify the threshold against which outage parameters are compared. By providing a range of sensitivity modes and enabling users to define their own threshold values, the system offers greater flexibility in monitoring adaptive streaming content according to individual requirements. This customization feature ensures that the monitoring system can be tailored to suit the specific needs of content providers, streaming services, and end users, allowing them to focus on the most relevant streaming issues and prioritize their monitoring efforts accordingly.

In terms of playlist alerting functionality, the system checks for manifest file download issues and raises alerts when it detects a problem. This ensures that users are promptly informed of any issues related to manifest file downloads, enabling them to take swift corrective action.

Overall, the monitoring system offers a robust and flexible solution for monitoring and managing the performance of adaptive streaming content. By incorporating selectable alert sensitivity modes and playlist alerting functionality, the system addresses the diverse needs of content providers, streaming services, and end users, ensuring a high-quality streaming experience for all parties involved.

Beyond the features and functionalities already described, the monitoring system is designed with scalability and adaptability in mind. As new streaming protocols or technologies emerge, the system can be easily updated and enhanced to support these advancements, ensuring that it remains relevant and effective in the ever-evolving landscape of streaming services.

Additionally, the monitoring system can be integrated with other tools and platforms, such as content delivery networks (CDNs), video player applications, and analytics services, to further enhance the user's ability to identify and address streaming issues.

Moreover, the monitoring system's design can be optimized for various deployment scenarios, such as cloud-based services, on-premises installations, or hybrid environments, catering to the unique needs and infrastructure of different content providers and streaming services.

In conclusion, the monitoring system for adaptive streaming content, with its selectable alert sensitivity modes and playlist alerting functionality, offers a comprehensive and versatile solution for ensuring the high-quality delivery of streaming content across various adaptive streaming protocols. Its adaptable and scalable design ensures that it remains a valuable asset for content providers, streaming services, and end users, as the industry continues to evolve and innovate.

The invention claimed is:

1. A method for monitoring adaptive streaming content with selectable alert sensitivity modes and playlist alerting functionality, the method being performed on a cloud server or an on-premises machine and comprising:
   downloading manifest files containing a list of dynamically updated segments of adaptive streaming content, wherein the streaming content is delivered using a generic adaptive streaming protocol;
   analyzing the manifest files and segments to identify rebuffering events and stream outages;
   selecting an alert sensitivity mode from a plurality of sensitivity modes, each sensitivity mode having a unique set of criteria for generating alerts;
   generating alerts based on the chosen sensitivity mode and identified rebuffering events or stream outages; and
   raising alerts for manifest files when a download failure occurs for a specific period of time.

2. The method of claim 1, wherein the plurality of sensitivity modes have different sensitivity profile designations such as a most sensitive mode, a normal sensitive mode, or a least sensitive mode, and the user can specify outage thresholds for each sensitivity mode.

3. The method of claim 1, wherein in the most sensitive mode, alerts are generated by measuring a contiguous time duration where the downloading of segments or manifest files is slower than the expected download time duration, and where the contiguous time duration exceeds the user-specified outage threshold.

4. The method of claim 1, wherein in the normal sensitive mode, alerts are generated by measuring a contiguous time duration where the downloading of segments or manifest files is slower than the expected download time duration, and where the accumulated time difference between the expected time duration and the downloading of segments or manifest files exceeds the user-specified outage threshold.

5. The method of claim 1, wherein in the least sensitive mode, alerts are generated by measuring a contiguous time duration where no segments or manifest files can be downloaded, and when the contiguous time duration exceeds the user-specified outage threshold.

6. The method of claim 1, wherein the generic adaptive streaming protocol is HTTP Live Streaming (HLS), and the method includes downloading and processing HLS master playlists, media playlists, and segments.

7. The method of claim 1, wherein the generic adaptive streaming protocol is Dynamic Adaptive Streaming over HTTP (DASH), and the method includes downloading and processing DASH manifest files, adaptation sets, and segments.

8. The method of claim 1, wherein the generic adaptive streaming protocol is Common Media Application Format (CMAF), and the method includes downloading and processing CMAF manifests, adaptation sets, and chunks.

9. The method of claim 1, wherein the user-specified settings include customizable alert delivery preferences such as email, SMS, or in-app notifications.

* * * * *